United States Patent [19]

Ochiai et al.

[11] Patent Number: 4,519,473
[45] Date of Patent: May 28, 1985

[54] COOLING SYSTEM FOR A MOTORCYCLE

[75] Inventors: Hideo Ochiai, Tokyo; Masumi Hamane; Masahiko Kimoto, both of Saitama, all of Japan

[73] Assignee: Honda Giken Kogyo Kabushiki Kaisha, Tokyo, Japan

[21] Appl. No.: 530,982

[22] Filed: Sep. 9, 1983

[30] Foreign Application Priority Data

Sep. 20, 1982 [JP] Japan .................. 57-163387

[51] Int. Cl.³ ................ B60K 11/04; B62K 11/00
[52] U.S. Cl. ................... 180/229; 180/68.1; 165/41
[58] Field of Search .............. 180/229, 219, 225, 226, 180/228, 230, 68.1; 165/41, 44, 51, 53, 54

[56] References Cited

U.S. PATENT DOCUMENTS 4,016,945 4/1977 Shibata ........................ 180/229
4,171,729 10/1979 Shibata ........................ 180/229

FOREIGN PATENT DOCUMENTS 477708 2/1953 Italy .......................... 180/229
57-58511 4/1982 Japan ......................... 180/229
141194 4/1920 United Kingdom .............. 180/225

Primary Examiner—John A. Pekar
Attorney, Agent, or Firm—Lyon & Lyon

[57] ABSTRACT

A motorcycle having a liquid-cooled engine with a liquid cooling system. The system includes a radiator, a water jacket about the engine and connecting feed and return lines. The radiator is located in the forward part of the motorcycle while the engine is located in the rear. The cooling lines pass beneath a step floor located intermediate a front leg shield and the rear body of the vehicle. A thermostat is positioned to selectively control flow through the return line while a water pump pumps flow to the engine. A bypass line extends from the uppermost portion of the cooling jacket at the engine to the radiator for extraction of air from the system. A pressure controlled radiator cap provides selective communication with a reserve tank.

10 Claims, 7 Drawing Figures

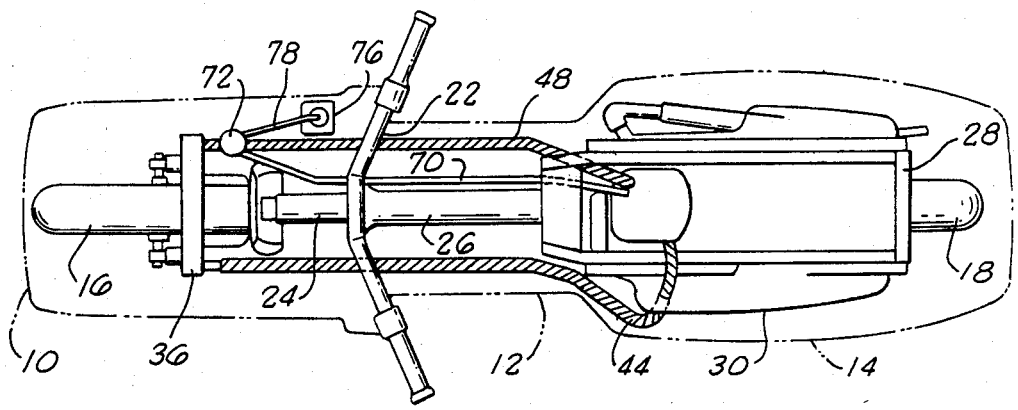
FIG. 3.
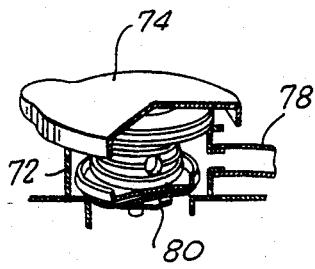
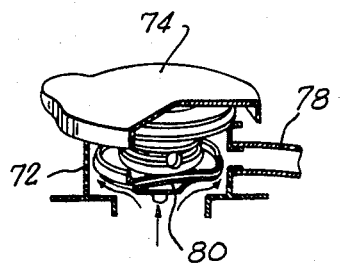
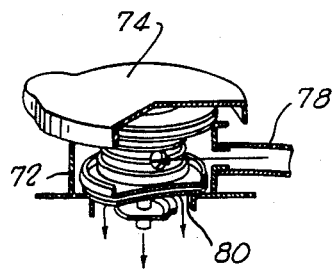
FIG. 5a.   FIG. 5b.   FIG. 5c.

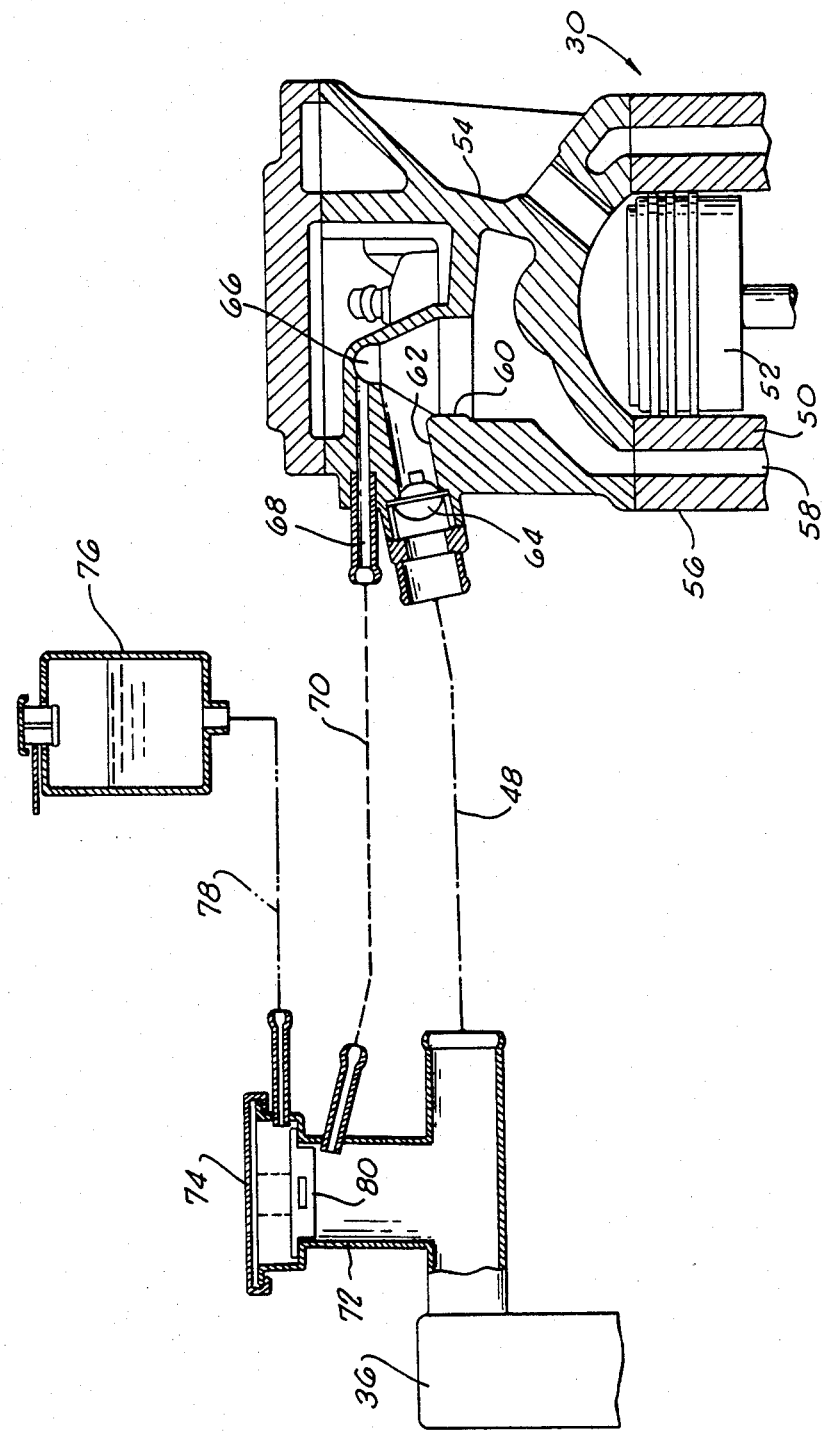

COOLING SYSTEM FOR A MOTORCYCLE

BACKGROUND OF THE INVENTION

The field of the present invention is a liquid cooling system for liquid cooled motorcycle engines and particularly those having a front leg shield, a step floor and the engine mounted behind the step floor.

Motorcycles and particularly smaller motorcycles such as motor scooters have typically employed air-cooled engines. Air-cooled engines are lighter in weight and require less space than liquid-cooled systems often referred to as water-cooled systems. With liquid cooling, a radiator is required along with a water jacket on the engine and tubing connecting the two. These features add both weight and require additional space. Cooling fluid also adds weight to the system. Furthermore, the radiator must be located in an area of the vehicle experiencing air flow during forward motion. Consequently, special ducting and additional space may be needed to realize proper radiator efficiency.

On smaller motorcycles, compact design is important to aesthetic appearance as well as low wind resistance, reduction in weight and space allocation for the components. Weight and weight distribution of components is also important for performance, efficiency and handling. In smaller motorcycles, added components can effect weight distribution and overall weight disproportionately because of an initial low weight.

In motorcycles and particularly smaller motorcycles such as motor scooters, an arrangement employing a front leg shield, a step floor rearwardly of the front leg shield and an engine driving the rear wheel from a location behind the step floor has been common. One location for the radiator of a liquid cooling system for a motorcycle of this design is at the front leg shield. In such a system, the feed and return lines of the cooling system may extend beneath the step floor. This location dictates that the top of the cooling jacket on the engine is above the lowermost portion of the feed and return lines. Consequently, air may become trapped in the water jacket as any path returning it to the radiator must extend downwardly from the water jacket. The size of the required return line for adequate cooling efficiency and the need to periodically terminate flow below certain cooling temperatures make it difficult to quickly and appropriately discharge the air from the cooling jacket.

SUMMARY OF THE INVENTION

The present invention is directed to a cooling system for a liquid-cooled engine of a motorcycle requiring that the lines extending between a radiator and a water jacket on the engine extend below the top of the water jacket. A bypass line is employed for discharging accumulated gases in the top of the water jacket to the radiator for eventual elimination from the system. In this way, feed and return lines of the cooling system may pass beneath the step floor of such a motorcycle where they are conveniently hidden from view. Additionally, the location of the radiator at the leg shield helps to distribute the weight of a water cooling system on the motorcycle and locates the radiator in a location where substantial air flow may be directed thereto without substantial compromises in weight and overall vehicle size.

In one aspect of the present invention, a flow restriction is introduced to the return line of the cooling system. This is preferably a thermostat which acts, when closed, to force flow through the bypass line. In another aspect of the present invention, the bypass line is substantially smaller than the return line of the cooling system. The size of this bypass line limits the amount of flow therethrough when the thermostat is closed for rapid engine heating. Additionally, with the bypass line having an internal cross sectional diameter in the range of from three millimeters to five millimeters, the air passing into the bypass line will not be allowed to percolate back up into the water jacket but will be forced by the pursuing water to flow to the radiator.

To insure air flow from the water jacket, the bypass line need extend only past the lowest point of the return line on the motorcycle where the bypass line may then be combined with the return line. The air from the bypass line will then flow upwardly to the radiator. This lowest point is generally below the step floor of the motorcycle. However, the bypass line may conveniently extend to the radiator for collection at the head thereof adjacent the pressure cap assembly.

Accordingly, it is an object of the present invention to provide an improved cooling system for a liquid-cooled engine on a motorcycle of the type having a front leg shield, a step floor and an engine mounted behind the step floor where the radiator is mounted at the front leg shield. Other and further objects and advantages will appear hereinafter.

BRIEF DESCRIPTION OF THE DRAWINGS

FIG. 3 is a plan view of the motorcycle of FIG. 2 with the body portion illustrated in phantom for clarity.

FIG. 4 is a cross-sectional elevation of the engine cooling system of the present invention partially in schematic.

FIGS. 5a, 5b and 5c are used depicting operation of the pressure regulatory valve of a cooling system of the present invention.

DETAILED DESCRIPTION OF THE PREFERRED EMBODIMENT

Figure 1:
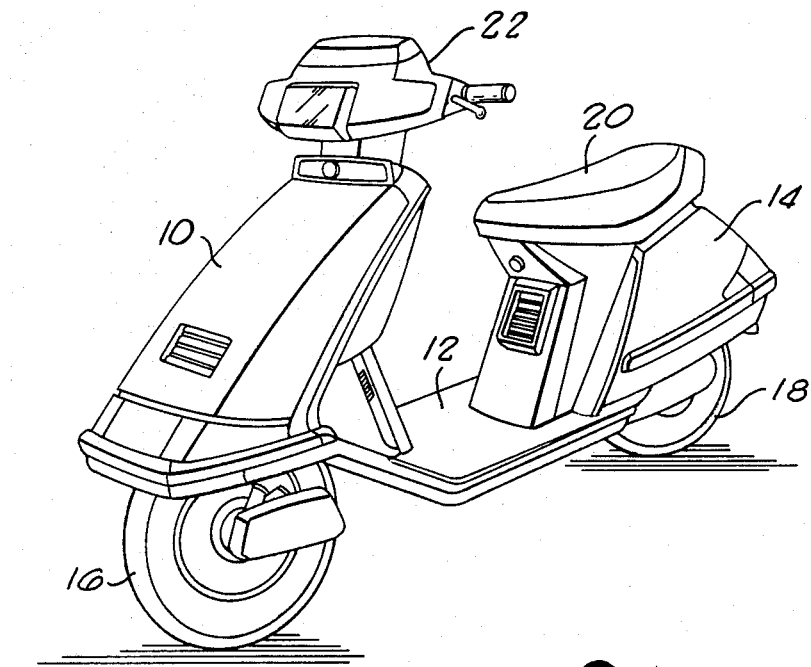
FIG. 1 is an oblique view of a motorcycle of the present invention.

Turning in detail to the drawings, a motorcycle employing a water-cooled engine system is illustrated. The motorcycle is illustrated to be of the scooter type having a front leg shield 10, a step floor 12 and a rear body portion 14. The motorcycle includes front and rear wheels 16 and 18, a seat 20 and a steering and handle grip assembly 22.

Figure 2:
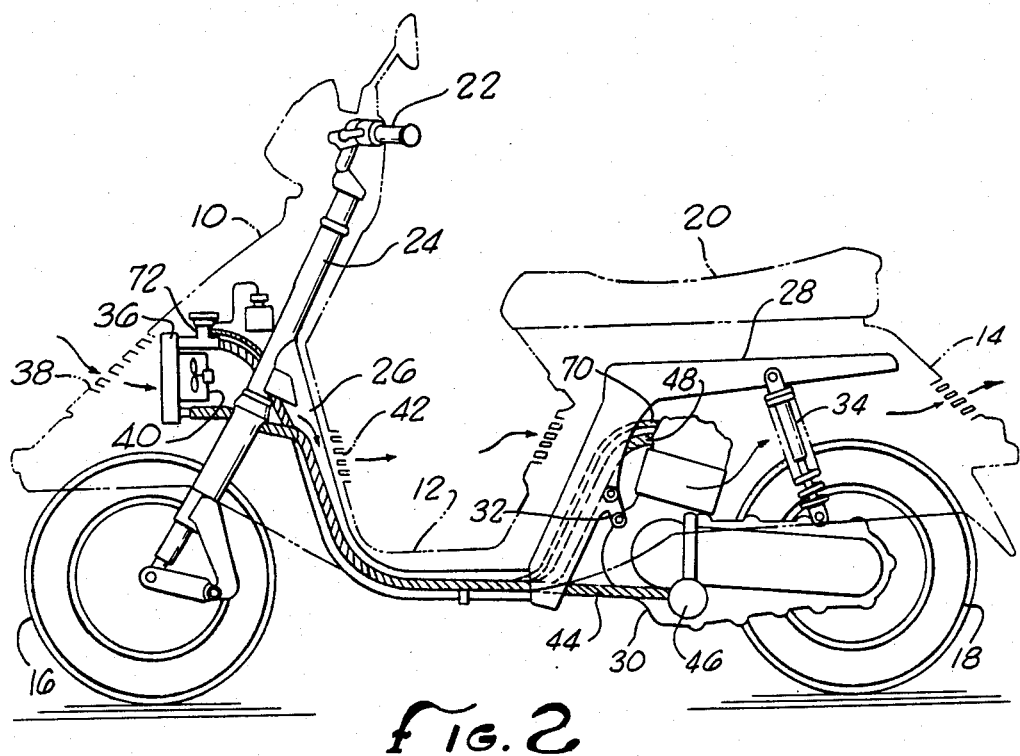
FIG. 2 is a side elevation of a motorcycle of the present invention with the body portion illustrated in phantom for clarity.

With reference to FIG. 2, it can be seen that the motorcycle frame includes a head pipe 24, a down tube 26 and a rear frame member 28. The down tube 26 extends downwardly from the head tube 24 and then rearwardly to meet with the rear frame member 28. The rear frame member extends upwardly and then rearwardly to form a base for the mounting of an engine and drive train assembly 30. The engine and drive train assembly 30 is pivotally mounted at pivot 32 to the rear frame member 28 and is resiliently biased near the rear wheel 18 by cushion assemblies 34.

The cooling system for the engine 30 includes a radiator 36 positioned at the front leg shield 10. Vents 38 are provided through the body of the front leg shield 10 to allow air to flow inwardly through the radiator 36. A fan assembly 40 may be employed to draw air through the radiator 36 as needed. Air exhausted from the radiator 36 may then flow downwardly and out beneath the step floor 12 or through exhaust vents 42 to provide heat to the rider.

Extending from the radiator 36 to the engine 30 is a feedline 44. The feedline extends below the step floor 12 and to a water pump 46. The water pump 46 induces flow to the engine from the feedline 44. A return line 48 extends from the engine 30 to the radiator 36. The return line 48 also extends below the step floor 12. The feedline 44 directs flow from the bottom of the radiator 36 while the return line 48 returns flow to the top of the radiator 36. Furthermore, the water pump 46 directs flow to the lower portion of the engine while the return line 48 returns flow from near the top of the engine 30.

Looking to FIG. 4 for clarity, the engine 30 includes a cylinder 50, a piston 52 and a head 54. A water jacket 56 extends around the cylinder 50 and forms a portion of the head 54. Cooling passages 58 extend around the cylinder 50 and into the head as defined by the cooling jacket 56. A collection chamber 60 is provided at the top of the passage 58 to collect return flow to be directed through an exhaust port 62 to the return line 48. Seated on the engine at the exhaust passage 62 is a thermostat 64. The thermostat provides selective flow restriction to restrict flow through the return line 48. The thermostat 64 generally responds to cooling liquid temperature to aid in the initial heating of the engine.

At the very top of the cooling passage 58 is a collection cavity 66 to which any air contained within the cooling system at the engine 30 will eventually collect. A vent passage 68 extends from the chamber 66 to a bypass line 70. The bypass line 70 extends from the engine at the vent passage 68 to the radiator 36. Conveniently, the bypass line 70 extends to the cap section 72 of the radiator 36.

The location of the chamber 66 and vent passage 68 extending to the bypass line 70 insures the eventual collection of all gases contained within the water jacket portion of the cooling system. The back pressure initially supplied by the thermostat 64 when it is closed and when the engine drives the water pump 46 forces air and liquid coolant through the bypass line 70 to the radiator 36. The air collects in the cap portion 72 of the radiator 36 during this period. Additionally, resistance normally in the return line 48 may result in some flow continuing through the bypass line 70. The bypass line 70 is not required to extend fully to the radiator 36. Rather, the bypass line need only extend passed the lowermost extent of the return line 48. At that point, all trapped air and gases will flow to the radiator with the returning coolant.

The selection of the line size for the bypass line 70 may aid in its operation. By having the line 70 substantially smaller than the return line 48, flow through the bypass line 70 may be restricted. In this way, the thermostat 64 is effective because there is only a small amount of flow bypassing the return line 48. This restricted flow may be brought about by an effective restriction in the bypass line 70 rather than through the use of an entire smaller tube. In this way, the bypass line may be substantially smaller through a restriction rather than through the tube itself.

A further consideration in the selection of the bypass line 70 is the ability of the flow to entrain air into the line. In this regard, a bypass line 70 of from three to five millimeters will result in the air within the bypass line exhibiting plug flow. Thus, the air will not be allowed to flow against the coolant flow direction back to the cooling jacket at the engine.

The radiator cap portion 72 includes a cap 74 connected to a reserve tank 76 by means of a hose 78. The cap 74 is of the pressure regulated valve type including a valve 80 which opens and closes responsive to pressure within the radiator 36 to control communication with the reserve tank 76.

The pressure regulating valve 80 operates in three ways as shown in FIGS. 5a, 5b and 5c, according to the pressure in the radiator 36. FIG. 5a illustrates the normal condition with the pressure in the radiator 36 less than the pressure setting for the valve (normally 0.75 to 1.05 kg/cm$_2$) As a result, the passage to the hose 78 is closed. In FIG. 5b, the pressure in the radiator 36 is higher than the set pressure such that the outer portion of the valve 80 lifts to open the passage to the hose 78. This allows high pressure air and cooling fluid within the radiator 36 to escape to the reserve tank 76. FIG. 5c illustrates the operation of the radiator cap when pressure within the radiator 36 becomes lower than a second set pressure. This results when the engine cools. The center portion of the valve 80 then opens to allow introduction of cooling liquid from the reserve tank 76 into the radiator 36. Naturally, the air within the reserve tank 76 has risen to above the fluid level and only cooling fluid is introduced in the mode illustrated in FIG. 6.

To illustrate the operation of the present system, an initial condition of operation is contemplated with air located within the cooling jacket passage 58 and with the engine in a cold state. When the engine is started, the water pump 46 forces coolant flow into the engine 30. This pressurizes the cooling jacket passages 58 and forces flow through the bypass line 70. The thermostat 64 is cold and in the closed state, preventing flow through the return line 48. Because the outlet of the cooling jacket passage 58 to the bypass line 70 is located at the uppermost portion of the engine, the air contained within the passage 58 is directed through the bypass line 70 followed by cooling fluid driven by the pump 46. Air then collects within the cap portion 72 of the radiator 36.

As the engine warms, the thermostat 64 opens allowing flow through the return line 48. This reduces the level of flow through the bypass line 70 which has previously evacuated all air from the water jacket portion of the engine 30. As the engine and cooling liquid heat, the cooling liquid expands and increases the pressure within the cooling system. Eventually, the valve 80 is forced upwardly to allow some volume within the cooling system to escape to the reservoir 76. Naturally, the entrapped air or other gases are allowed to escape first, filtering through the liquid within the reserve tank 76. In this way, air is purged from the entire cooling system.

With the later cooling of the engine, liquid contained within the reserve tank 76 is drawn back into the radiator 36 through the valve 80 when there is reduced pressure within the cooling system. In this way, liquid replaces the previously entrapped air and gases within the cooling system.

Thus, an improved cooling system for a water-cooled engine is disclosed which aids in the removal of entrapped air and gases. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A cooling system for a motorcycle having a front leg shield, a step floor and an engine mounted behind the step floor, comprising
    a radiator mounted at the front leg shield;
    a feed line extending below the step floor from said radiator to the engine;
    a return line extending below the step floor from the engine to said radiator;
    a thermostat selectively restricting flow to the radiator through said return line; and
    a bypass line extending from the engine to forwardly of the step floor and being in communication with said radiator, said bypass line being substantially smaller than said return line.

2. The cooling system of claim 1 further comprising a pump pumping flow from said feedline.

3. The cooling system of claim 1 further comprising a cooling jacket at the engine, said bypass line extending from said engine at the top of said cooling jacket.

4. The cooling system of claim 1 wherein said bypass line extends to said radiator.

5. The cooling system of claim 1 wherein said thermostat is seated on the engine at a first end of said return line.

6. The cooling system of claim 1 wherein said bypass line is in the range from three to five millimeters in internal cross sectional diameter.

7. A cooling system for a motorcycle having a front leg shield, a step floor and an engine mounted behind the step floor, comprising
    a radiator mounted at the front leg shield;
    a cooling jacket at the engine;
    a feedline extending below the step floor from said radiator to said cooling jacket;
    a return line extending below the step floor from said cooling jacket to said radiator;
    a thermostat selectively restricting flow through said return line;
    a bypass line extending from said cooling jacket to forwardly of the step floor and being in communication with said radiator, said bypass line being substantially smaller than said return line; and
    a pump inducing flow to said cooling jacket from said feedline.

8. The cooling system of claim 7 wherein said bypass line extends from the top of said cooling jacket.

9. The cooling system of claim 7 wherein said bypass line extends to said radiator.

10. The cooling system of claim 7 wherein said bypass line has an internal cross sectional dimension of from about three to five millemeters.

* * * * *